(12) United States Patent
Nagata

(10) Patent No.: US 9,545,680 B2
(45) Date of Patent: Jan. 17, 2017

(54) DEVICE AND METHOD FOR MANUFACTURING CROWN GEAR

(71) Applicant: AISIN SEIKI KABUSHIKI KAISHA, Kariya-shi (JP)

(72) Inventor: Eiri Nagata, Toyoake (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 152 days.

(21) Appl. No.: 14/399,605

(22) PCT Filed: May 29, 2013

(86) PCT No.: PCT/JP2013/064924
§ 371 (c)(1),
(2) Date: Nov. 7, 2014

(87) PCT Pub. No.: WO2013/190964
PCT Pub. Date: Dec. 27, 2013

(65) Prior Publication Data
US 2015/0147129 A1 May 28, 2015

(30) Foreign Application Priority Data
Jun. 22, 2012 (JP) .................................. 2012-141330

(51) Int. Cl.
*B23F 21/12* (2006.01)
*B23F 15/06* (2006.01)
(Continued)

(52) U.S. Cl.
CPC .............. *B23F 15/06* (2013.01); *B23F 5/163* (2013.01); *B23F 9/08* (2013.01); *B23F 21/12* (2013.01);
(Continued)

(58) Field of Classification Search
CPC .............. Y10T 409/107791; Y10T 409/10795; Y10T 409/108268; Y10T 409/108109; Y10T 409/103816; Y10T 409/103975; Y10T 409/10477; Y10T 409/107632; Y10T 407/1735; Y10T 407/1745; B23F 9/08; B23F 9/082; B23F 9/10; B23F 9/14; B23F 21/12; B23F 21/122; B23F 21/22
See application file for complete search history.

(56) References Cited

U.S. PATENT DOCUMENTS 1,398,039 A 11/1921 Olson
3,145,621 A 8/1964 Ransom
(Continued)

FOREIGN PATENT DOCUMENTS

CN 102256735 A 11/2011
DE 4122460 C1 * 4/1992 .............. B23F 5/163
(Continued)

OTHER PUBLICATIONS

Combined Office Action and Search Report issued Nov. 3, 2015 in Chinese Patent Application No. 201380031190.7 (with English translation).
(Continued)

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

The inventive device includes a work supporting portion for supporting a work rotatably about a first axis, a cutter supporting portion for supporting a cutter rotatably about a second axis different from the first axis and a moving portion for moving the cutter along a reference line extending through the first axis. The second axis is slanted relative to
(Continued)

a reference plane oriented perpendicular to the first axis and a blade edge of the cutter is caused to come into contact with the work at an offset position offset from the reference line. The work and the cutter are driven in synchronism and the cutter is moved along the reference line.

9 Claims, 6 Drawing Sheets

(51) Int. Cl.
      *B23F 23/12*     (2006.01)
      *B23F 5/16*      (2006.01)
      *B23F 9/10*      (2006.01)
      *B23F 9/14*      (2006.01)
      *B23F 9/08*      (2006.01)
      *B23F 21/22*     (2006.01)

(52) U.S. Cl.
      CPC ............ *B23F 23/1237* (2013.01); *B23F 9/082* (2013.01); *B23F 9/10* (2013.01); *B23F 9/14* (2013.01); *B23F 21/122* (2013.01); *B23F 21/22* (2013.01); *Y10T 407/1735* (2015.01); *Y10T 407/1745* (2015.01); *Y10T 409/10477* (2015.01); *Y10T 409/10795* (2015.01); *Y10T 409/103975* (2015.01); *Y10T 409/104929* (2015.01); *Y10T 409/107632* (2015.01); *Y10T 409/107791* (2015.01); *Y10T 409/108109* (2015.01); *Y10T 409/108268* (2015.01)

(56) References Cited

U.S. PATENT DOCUMENTS

| | | | | |
|---|---|---|---|---|
| 4,066,001 A | * | 1/1978 | Nishijima | B23F 5/163 407/28 |
| 4,467,568 A | | 8/1984 | Bloch et al. | |
| 4,543,020 A | * | 9/1985 | Shtipelman | B23F 5/14 29/26 R |
| 4,589,174 A | * | 5/1986 | Allen | B23Q 1/48 29/33 R |
| 4,865,497 A | * | 9/1989 | Faulstich | B23F 5/163 409/12 |
| 4,949,456 A | | 8/1990 | Kovach et al. | |
| 5,413,520 A | * | 5/1995 | Feisel | B23F 19/055 451/1 |
| 6,200,198 B1 | * | 3/2001 | Ukai | B23Q 11/0042 451/449 |
| 2007/0214643 A1 | | 9/2007 | Nagata et al. | |
| 2009/0060671 A1 | | 3/2009 | Langerfeld | |
| 2009/0123243 A1 | * | 5/2009 | Nomura | B23B 41/02 408/1 R |
| 2010/0111629 A1 | | 5/2010 | Duerr | |
| 2012/0003058 A1 | | 1/2012 | Hutter et al. | |

FOREIGN PATENT DOCUMENTS

| | | | |
|---|---|---|---|
| DE | 10 2009 003 601 A1 | | 9/2010 |
| JP | 2 224919 | | 9/1990 |
| JP | 08257823 A | * | 10/1996 |
| JP | 2001-25915 A | | 1/2001 |
| JP | 2003-300112 A | | 10/2003 |
| JP | 2006-26762 A | | 2/2006 |
| JP | 2007 253248 | | 10/2007 |
| JP | 2010 105155 | | 5/2010 |
| JP | 2012 45687 | | 3/2012 |
| JP | 2012 512040 | | 5/2012 |
| WO | 2010 102992 | | 9/2010 |

OTHER PUBLICATIONS

International Preliminary Report on Patentability and Written Opinion issued Dec. 31, 2014 in PCT/JP2013/064924 (submitting English translation only).

International Search Report Issued Aug. 27, 2013 in PCT/JP13/064924 Filed May 29, 2013.

Extended European Search Report issued Feb. 22, 2016 in Patent Application 13806324.3.

* cited by examiner

DEVICE AND METHOD FOR MANUFACTURING CROWN GEAR

TECHNICAL FIELD

The present invention relates to a device for manufacturing a crown gear and relates also to a method for manufacturing a crown gear. More particularly, the invention relates to a technique of manufacturing a crown gear by skiving.

BACKGROUND ART

As a method of manufacturing a gear by skiving, according to Patent Document 1, an annular-disc like work is supported to be rotatable about a rotational axis. There is provided a pinion type cutter supported to be rotatable about a rotational axis different from the rotational axis of the work. And, the work and the cutter are driven in synchronism. In this method, as the cutter is moved along a direction of tooth trace of the gear, the work is cut by the cutter to manufacture an internal gear.

PRIOR ART DOCUMENT

Patent Document

Patent Document 1: Japanese Unexamined Patent Application Publication No. 2012-45687

SUMMARY OF THE INVENTION

Problem to be Solved by Invention

When a cutter operation (tooth cutting operation) of a work is effected by skiving, "skidding" is caused by a relative movement between contacting portions of the work and the cutter, thus realizing cutting by this "skidding". In the case of a device for manufacturing a gear by skiving, the cutting operation is effected with continuously rotating the work and the cutter in synchronism. Thus, high speed rotations of the work and the cutter are made possible for improvement of the manufacturing efficiency.

Now, let us consider a case of manufacturing a crown gear by skiving, the crown gear having teeth in a portion of rotational flat face around an axis. With a device used here, an annular-disc like work is supported to be rotatable about a rotational axis. A reference line is set to extend along a radial direction from this rotational axis. A second rotational axis is set parallel with the reference line as viewed along the extending direction of the rotational axis. A pinion-type cutter is disposed which is rotatable about this second rotational axis. With this, a cutting operation is effected with rotating the work and the cutter in synchronism.

In the above, if the second rotational axis is overlapped with the rotational axis of the work when viewed along the direction of the rotational axis of the work, when the work and the cutter are rotated in synchronism, there will simply be formed a gear with less skidding therebetween. Therefore, in order to cut a tooth along the radial direction of the work, it is necessary to feed and move the cutter radially relative to the work. In order to form multiple of such teeth along the circumferential direction of the work, it is necessary to repeat the feeding of the cutter for each tooth trace, so the feeding operation of the cutter relative to the work becomes troublesome.

On the other hand, in the case of an arrangement wherein the second rotational axis is offset from the rotational axis of the work, that is, the second rotational axis is set at a position off the rotational axis of the work, "skidding" occurs when the work and the cutter are rotated relative to each other. This is because an advancing direction of a specific point on the work surface differs from an advancing direction of a specific point on the cutter surface corresponding thereto. As this "skidding" provides an effect similar to that of the above-described feeding operation, cutting of the work is made possible.

However, in the case of a worm-gear like cutter, it is necessary to set a tooth shape in correspondence with a shape of tooth formed by cutting, and moreover, the diameter of the cutter is small since there is imposed a limit on the number of teeth formed in the circumference of the cutter in correspondence with a number of teeth to be formed in the work. For this reason, deformation tends to occur in the cutter along a bending direction during a cutting operation, which sometimes invites an error or irregularity in the shape of formed teeth.

As described above, it is considered effective to form a cutter in a spiral shape like a worm gear, but when the spiral shaped cutter is used in a simple manner as above, as there is certain unreasonableness in such shape of cutter, it becomes difficult for this cutter to manufacture a crown gear by cutting a work with high precision. In this respect, there remains room for improvement.

The object of the present invention is to configure a device and a method for manufacturing a crown gear by skiving in a reasonable manner.

Means for Achieving the Object

According to a characterizing feature of the present invention, a device for manufacturing a crown gear comprises:

a work supporting portion for supporting a work rotatably about a first axis;

a cutter supporting portion for supporting a cutter rotatably about a second axis different from the first axis;

a synchronized driving portion for rotating the work supporting portion and the cutter supporting portion in synchronism with each other; and a moving portion for moving the cutter supporting portion relative to the work supporting portion;

wherein the second axis is disposed under a set posture along a reference line passing through the first axis and set at an offset region offset from the reference line as viewed along a direction parallel with the first axis and the second axis is disposed under a posture slanted relative to a reference plane extending perpendicular to the first axis, whereby the work supporting portion and the cutter supporting portion are configured to cause a leading end of the cutter to contact at the offset region at an angle relative to a rotational plane of the work;

the synchronized driving portion rotates the work supporting portion and the cutter supporting portion in synchronism in such a manner to move an outer circumference of a blade edge at the leading end of the cutter in a direction same as a rotational direction of the work; and the moving portion moves the cutter in a direction along the reference line.

With the above-described arrangement, when the work is supported to the work supporting portion and the cutter is supported to the cutter supporting portion, the blade edge of the leading end of the cutter is placed in contact with the work at the offset region. Then, when the work and the cutter are driven in synchronism under this condition, as the blade edge of the cutter is in contact with the work at the offset region, there occurs "skidding" wherein the work is displaced radially outward or radially inward relative to the blade edge of the cutter, thus enabling cutting of the work.

Further, since the second axis of the cutter has a slant angle relative to the rotational plane of the work, the blade edge of the cutter comes into contact angularly with the rotational plane of the work. Thus, there is no need to form a clearance angle in the cutter. It is needed only to form a spiral shaped tooth in the surface of the cutter and there is no need to form a plurality of teeth intermittently like a blade of a hob cutter. Hence, the cutter configuration can be simple. Further, as the blade shape of the cutter is adapted for the tooth shape of a crown gear to be formed, there is no need for re-cutting of teeth faces of the crown gear after cutting.

In this way, with the above-described arrangement of the work and the cutter, there has been realized a device for manufacturing a crown gear by skiving in a reasonable manner.

Preferably, in the present invention, the blade edge of the cutter projects outwards from the second axis;

a blade body portion is formed in a spiral shape to extend continuously from the blade edge along the second axis; and a scoop angle is set to render the blade edge to a posture where the blade edge progressively projects or recedes in the direction along the second axis as the blade edge moves away from the second axis.

With the above-described arrangement, in the cutter configured to have its blade edge projecting, the scoop angle of the blade edge relative to the work during a cutting operation is formed small, so that the cutting operation will proceed with the blade edge biting into the work. Therefore, the linearity of the cutter feeding is improved, thus improving the working efficiency. Conversely, in the case of the cutter with its blade edge being set to recede, the scoop angle of the blade edge relative to the work during a cutting operation is formed large, so that resistance experienced by the blade edge of the cutter contacting the work is increased. However, as the cut face of the work is formed smooth, excessive biting of the blade edge of the cutter into it is prevented and rotational condition of the cutter is maintained appropriately. And, due to the increase in the scoop angle, the service life of the cutter is improved also.

Preferably, in the present invention, an oil supplying hole for supplying oil to the blade edge is formed along the second axis.

With the above-described arrangement, by supplying an amount of oil to the vicinity of the blade edge through the oil supplying hole during a cutting operation, resistance in association with the cutting operation can be reduced. Further, as heat generated during the cutting operation is removed, the property of the work will hardly change, whereby damage of the cutter can be avoided. Moreover, cutting chips produced from the cutting operation can be discharged effectively by the flow of oil.

Preferably, in the present invention, the cutter supporting portion includes an intermediate supporting portion for supporting the blade edge at an intermediate position of the cutter relative to a longitudinal direction thereof.

With the above-described arrangement, even when a bending force is applied to the cutter during a cutting operation, the intermediate supporting portion will restrict bending deformation of the cutter, so that the cutting precision can be enhanced.

Preferably, in the present invention, the cutter supporting portion includes a posture changing mechanism for changing the posture of the cutter about a pivot axis parallel with the first axis;

the posture changing mechanism changes the posture of the second axis in correspondence with a tooth shape of a crown gear to be manufactured when the cutter is moved along the reference line by the moving portion.

With the above-described arrangement, in case the tooth trace of the gear is curved as is the case with a hypoid gear for instance, when the second axis and this tooth trace of the cutter are viewed along the direction of the first axis, intersection angles between the tooth trace and the second axis differ from each other between the outer circumference side and the inner circumference side of the work. Therefore, the tooth shape formed on the outer circumference side of the work will differ slightly from the tooth shape formed on the inner circumference side of the work. With the above-described arrangement, as the second axis of the cutter is rotated about the axis parallel with the first axis while the work is being fed toward the center of the work, the tooth trace to be formed in the work and the second axis will be constantly maintained at a fixed angle. With this, it becomes possible to obtain a tooth shape having a same cross sectional shape at all positions from the outer circumference side to the inner circumference side of the work.

In the present invention, optionally, the moving portion moves the cutter supporting portion back and forth along a guide rail.

With the above-described arrangement, as the moving portion is moved along the guide rail, the precision of the movement of the cutter can be increased.

In the present invention, optionally, the intermediate supporting portion supports the cutter to the cutter supporting portion via a support ring.

With the above-described arrangement, even when the cutter is bent by an external force, bending of the cutter is restricted by the support ring, whereby the working precision of the crown gear can be enhanced.

In the present invention, optionally, the blade edge of the cutter is set with a scoop angle having a slant angle relative to the reference plane under a posture perpendicular to the rotational axis of this cutter.

In the case of a positive scoop angle set to project in the direction along the axis of the cutter toward the outer circumference side thereof, there is realized an efficient cutting operation with sharp scooping Whereas, in the case of a scoop angle set to recede in the direction along the axis of the cutter, there is realized improvement in the service life of the cutter.

In the present invention, optionally, the blade edge of the cutter passes a contact point contacting the work and the cutter is pivoted about a pivot axis parallel with the first axis.

With the above-described arrangement, as the cutter is pivoted about the pivot axis, the work can be cut with the posture of the cutter being varied as viewed in the direction along the first axis.

In the present invention, optionally, while the moving portion is feeding the cutter toward the center of the work, the posture changing mechanism pivots the cutter about the pivot axis so as to constantly maintain a tooth trace formed in the work and the second axis at a fixed angle as viewed in the direction along the first axis.

With the above-described arrangement, in the case also where a crown gear having a non-linear shape in the tooth trace direction thereof, the cross sectional shape of the teeth formed in the work can be rendered equal and uniform by constantly maintaining the tooth trace to be formed in the work in case cutting is effected from the outer circumference side to the inner circumference side of the work and the second axis to a fixed angle as seen in the direction along the first axis.

According to a characterizing feature of the present invention, a method for manufacturing a crown gear comprises the steps of:

supporting a work rotatably about a first axis;

supporting a cutter rotatably about a second axis different from the first axis;

disposing the work and the cutter with disposing the second axis under a set posture along a reference line passing through the first axis and at an offset region offset from the reference line as viewed along a direction parallel with the first axis and disposing the second axis under a posture slanted relative to a reference plane extending perpendicular to the first axis, whereby the work and the cutter are configured to cause a leading end of the cutter to contact with the work at the offset region at an angle relative to a rotational plane of the work;

rotating the work and the cutter in synchronism in such a manner to move an outer circumference of a blade edge at the leading end of the cutter in a direction same as a rotational direction of the work; and moving the cutter parallel with the reference line, whereby the work is cut by the cutter.

In this case, it is necessary to provide relative rotation, i.e. a so-called differential motion, between the first axis and the second axis synchronized with each other.

With the above-described arrangement, when the work and the cutter are rotated in synchronism, as contact points thereof are rotated in different directions, there occurs "skidding" therebetween. As a result, cutting of the work is made possible only by rotating the work and the cutter relative to each other. Further, as the cutter is fed and moved from the outer circumference side to the inner circumference side of the work, a tooth trace is formed.

In the course of the above, the blade edge of the cutter will be slanted relative to the rotational plane of the work and the cutter will come into contact with the work surface with a predetermined scoop angle and clearance angle. Therefore, the configuration of the cutter can be simplified by e.g. omission of a trouble of forming a clearance angle in the cutter.

Moreover, of the blade edge of the cutter, a portion thereof contributing to cutting is limited to its leading end and the blade edge can be formed in a spiral form relative to the outer circumference of the cutter, so that it is possible to always prepare a fresh blade edge. Consequently, there is achieved cost advantage of the cutter which is a consumable item.

Incidentally, the cross sectional shape of the blade edge of the cutter should be designed so as to form a tooth shape having a predetermined cross section in the work when the cutter under a slanted posture comes into contact with the cutter. With this arrangement, there is no need for re-cutting of teeth faces of the crown gear after cutting.

In this way, with the above-described method, through appropriate disposing of the work and the cutter, a crown gear can be manufactured by skiving in a reasonable manner.

MODES OF EMBODYING THE INVENTION

Next, modes of embodying the present invention will be explained with reference to the accompanying drawings.

[General Construction]

Figure 1:
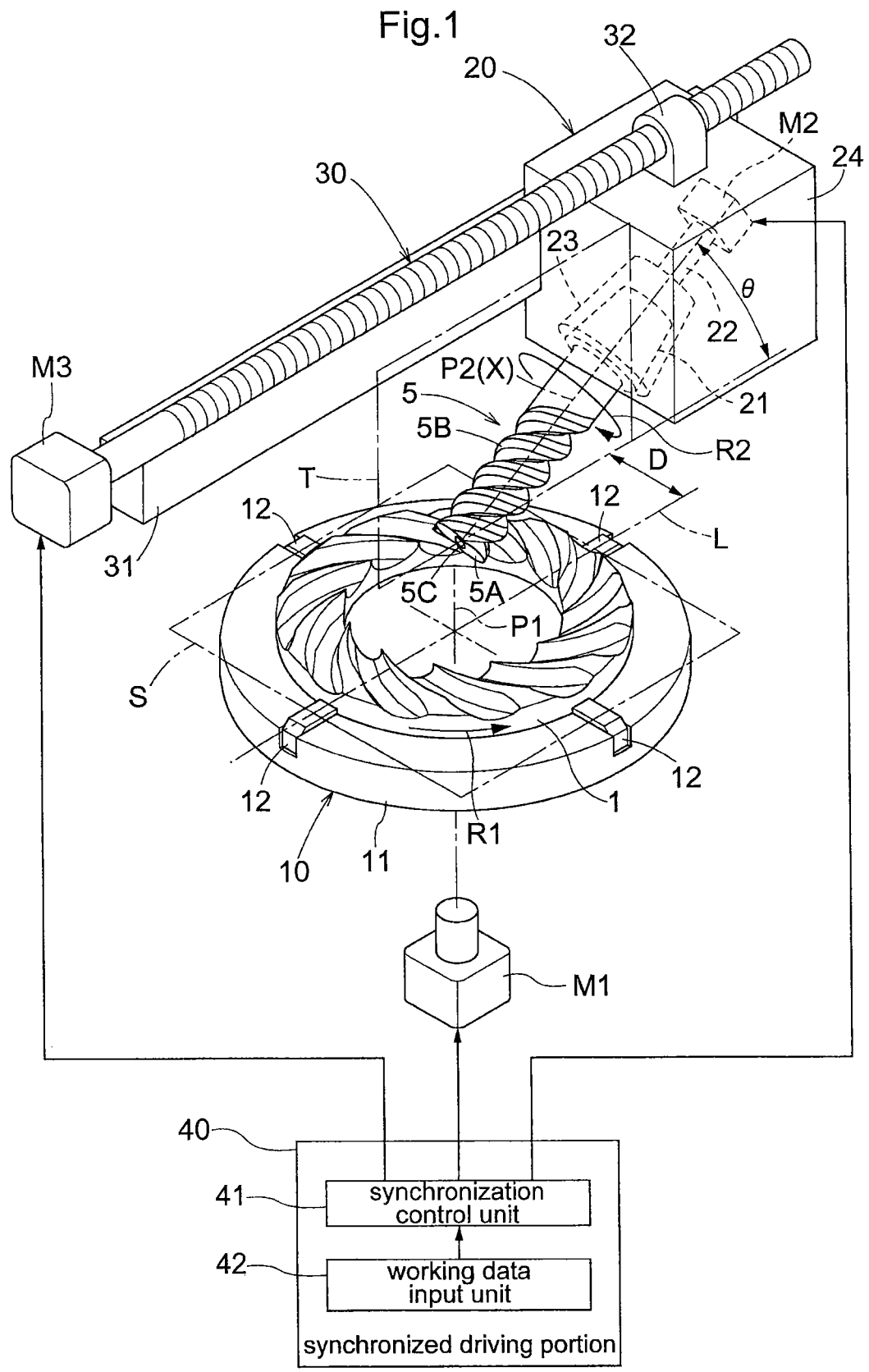
FIG. 1 is a view showing a construction of a device for manufacturing a crown gear.
Figure 2:
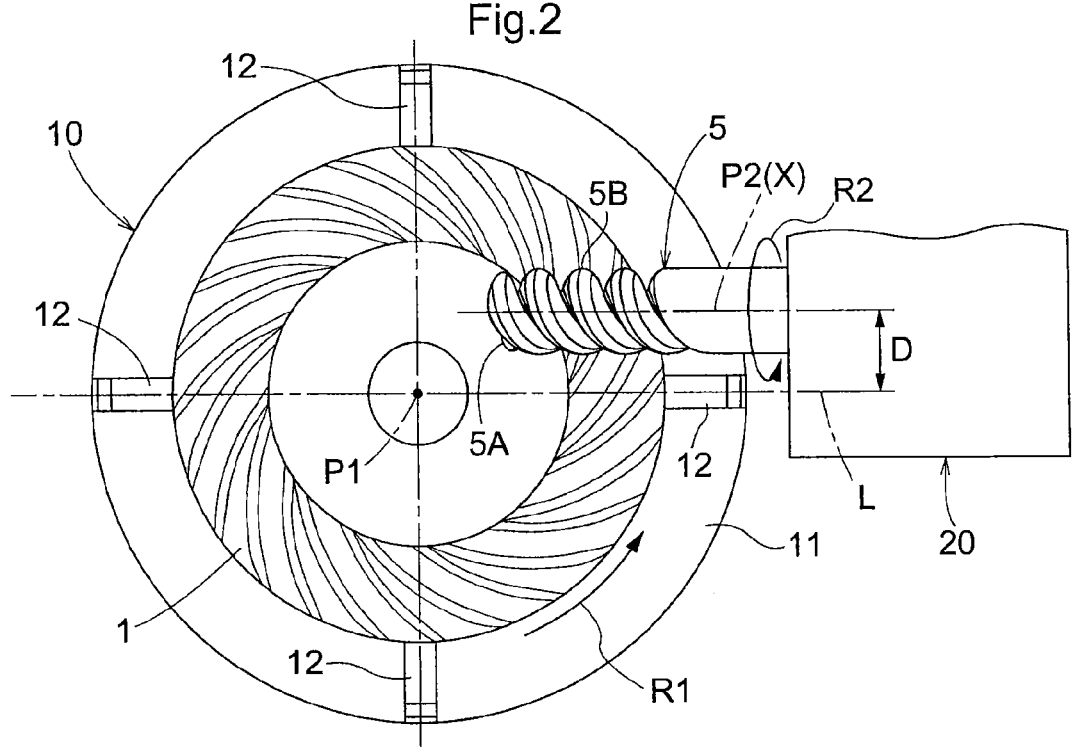
FIG. 2 is a side view showing positions of a work and a cutter in the crown gear manufacturing device.
Figure 3:
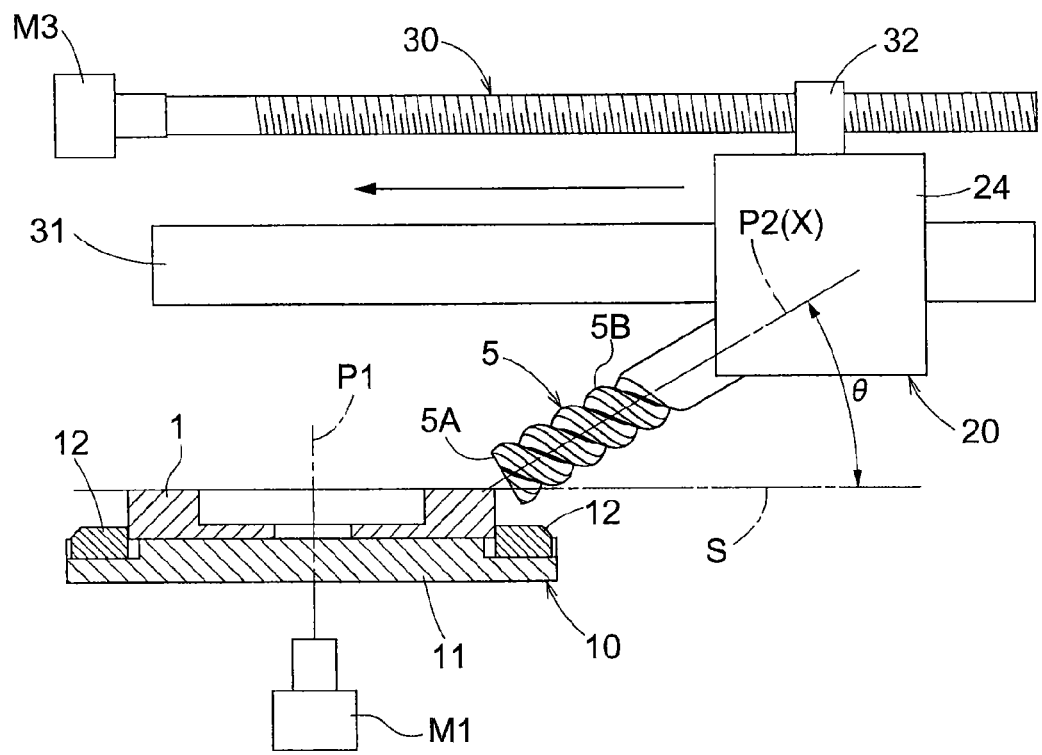
FIG. 3 is a side view showing positions of the work and the cutter in the crown gear manufacturing device.

As shown in FIGS. 1-3, a crown gear manufacturing device includes a work supporting portion 10 for supporting a work 1 to be manufactured rotatably about a vertically oriented first axis P1, a cutter supporting portion 20 for supporting a cutter 5 rotatably about a second axis P2 different from the first axis P1, a moving portion 30 for moving the cutter supporting portion 20 relative to the work supporting portion 10, and a synchronized driving portion 40 for driving the work supporting portion 10 and the cutter supporting portion 20 in synchronism with each other by applying driving forces thereto.

The language "crown gear" herein is a generic name of gears having crown shape with teeth formed to extend perpendicular to a rotational axis, being inclusive of phase gears, a well as helical gears having a straight gear trace direction or a slanted gear trace direction. In particular, a crown gear of the invention will be effective for use as a high speed-reducing phase gear employed in a speed reducing system having a speed reducing ratio of 3 or more. In such high speed-reducing gear, its meshing-partner gear is formed as a small gear or a worm gear. Incidentally, of crown gears, those meshed with a pinion gear, a worm gear, etc. in a positional relationship offset from the axis are sometimes called crown gears, whereas those meshed with a pinion gear, a worm gear, etc. in a positional relationship perpendicular to the axis are sometimes called phase gears. However, in the context of the present invention, the language "crown gear" is understood as a concept inclusive of phase gears. And, with the inventive device for manufacturing a crown gear, it is possible to manufacture not only a crown gear, but also a phase gear.

Further, with the inventive crown gear manufacturing device, in addition to the crown gear (or helical gear), a phase gear with two axes extending perpendicular to each other, as well as phase gears having two axes being offset from each other, can also be manufactured. Especially, among the phase gears, with the high speed-reducing phase gear having a speed reducing ratio of 3 or more, it is required to keep the number of teeth of the cutter small. Therefore, the present invention will be useful especially therefor.

The second axis P2 is set under a parallel posture (an example of "set posture") along a reference line L passing through the first axis P1 and extending radially as viewed in the direction along the first axis P1 and at an offset region offset by a set distance D from the reference line L. And, the second axis P2 is slanted by a slant angle θ relative to a reference plane S oriented perpendicularly to the first axis P1. The moving portion 30 has a moving direction which is set so as to move the cutter 5 linearly along a moving direction parallel with the reference line L.

That is, the cutter 5, when at a position way from the reference line L by the set distance D in the offset region, is slanted in a virtual plane T oriented parallel with the first axis P1 and the reference line L.

The synchronized driving portion 40 drives the work 1 and the cutter 5 in synchronism with each other so as to move an outer circumference of a blade edge 5A at the leading end of the cutter 5 toward the same direction as the moving direction of the work 1 at the same speed as the moving speed by rotation of this work 1, and the cutter 5 is moved in a direction parallel with the reference line L. With this, cutting is effected by skiving utilizing "skidding" occurring between the work 1 and the cutter 5 (skiving tooth cutting).

[Specific Configuration of Device]

The work supporting portion 10 includes a turn table 11 supported via a bearing to be rotatable about the vertically oriented first axis P1 and a plurality of chucks 12 for fixing the work 1 relative to this turn table 11; and the work supporting portion 10 is provided with a first electric motor M1 for driving/turning the turn table 11 about the first axis P1.

The cutter supporting portion 20 includes a holder 21 for holding a base end portion of the cutter 5, a spindle 22 for transmitting a rotational drive force to this holder 21, and a supporting block 23 for supporting the spindle 22 rotatably about the second axis P2. This cutter supporting portion 20 is provided with a second electric motor M2 for rotatably driving the spindle 22. The supporting block 23 and the second electric motor M2 are supported to a movable frame 24.

The movable frame 24 is supported to be movable relative to a guide rail 31 oriented parallel with the reference line L1; and the moving portion 30 includes a screw type moving mechanism 32 for moving the movable frame 24 back and forth along the guide rail 31 and a third electric motor M3 for driving this moving mechanism 32.

The first electric motor M1, the second electric motor M2 and the third electric motor M3 respectively employ synchronous motors capable of control of rotational speeds thereof by driving signals. The synchronized driving portion 40 includes a synchronization control unit 41 having a microprocessor, a DSP or the like for controlling the first electric motor M1, the second electric motor M2 and the third electric motor M3, a means for acquiring work data so as to provide this synchronization control unit 41 with the working data, and a work data unit 42 having e.g. a storage for storing the work data.

Incidentally, in FIG. 1, the crown gear manufacturing device is shown schematically so as to show its characterizing features for realizing the inventive arrangements thereof. This manufacturing device can be configured to include the cutter supporting portion 20 at a leading end of a manipulator. In such device having a manipulator as described above, a portion thereof having a mechanism for moving the cutter 5 will constitute the moving portion 30 in the context of the present invention.

[Cutter]

Figure 4:
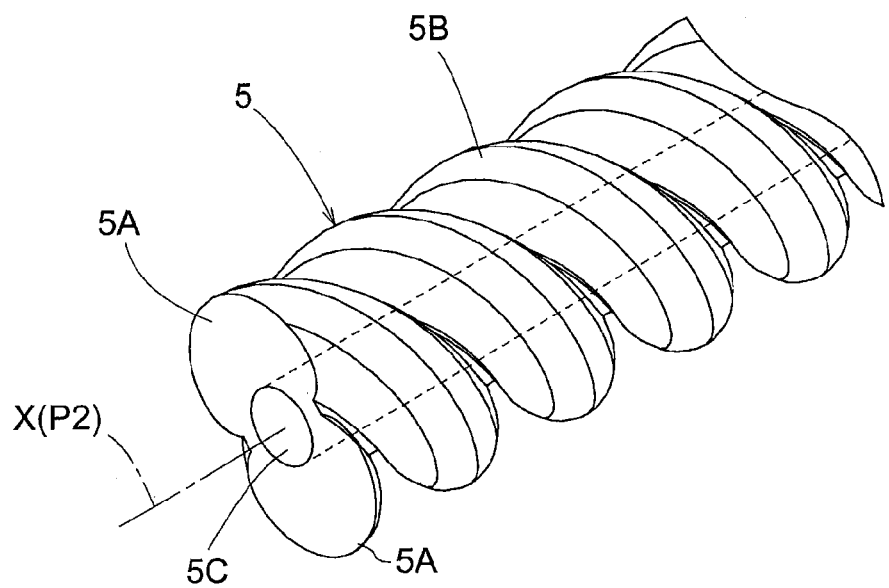
FIG. 4 is a perspective view showing a leading end portion of the cutter.
Figure 5:
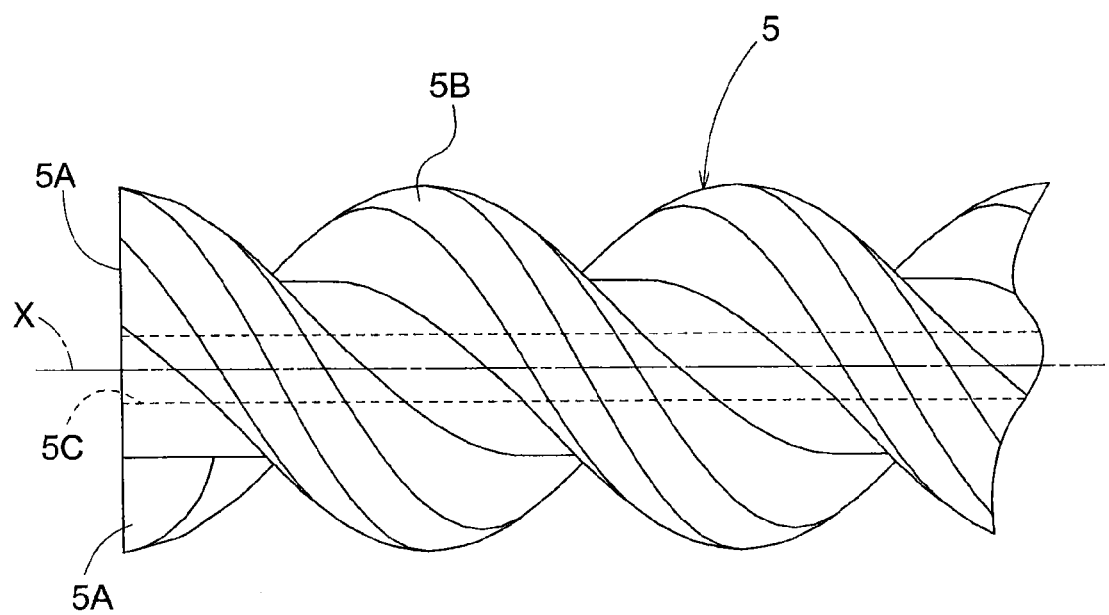
FIG. 5 is a side view showing the leading end portion of the cutter.

The cutter shown in FIG. 4 and FIG. 5 is an example having 2 (two) teeth. In this case, the cutter 5 is provided in the form of a bar extending along a rotational axis X which is set coaxial with the second axis P2 and forms, at the leading end thereof, a pair of blade edges 5A extending from the rotational axis and a blade body portion 5B extends in a spiral form from the blade edges 5A. The leading end of the cutter 5 as viewed in the direction along the rotational axis X is gourd-shaped, with the blade edges 5A being formed at outer circumference portion and an oil supplying hole 5C being defined along the rotational axis X. This cutter 5 is formed by shaping a round bar member formed of tool steel or super-hard alloy such as WC—Co type, etc., and its cross sectional shape formed when cut in the direction perpendicular to the rotational axis X is in agreement with the gourd-shape at the leading end.

Teeth of a crown gear are cut by a cutting operation with setting the cutter 5 to a posture slanted by a slant angle θ relative to the reference plane S. Therefore, the pair of blade edges 5A are formed with a shape which copies the shape of the tooth from its tooth bottom to the tooth crest. With this, in association with a cutting operation by rotation of the cutter 5, teeth and tooth grooves will be formed continuously in the work 1 along the circumferential direction.

Further, when the cutting operation is effected with keeping the blade edges 5A in contact with the work 1, a working reaction force is applied from the work 1 to the cutter 5. Such working reaction force will cause a bending deformation in the cutter 5. However, in the instant embodiment, as the second axis P2 of the cutter 5 is slanted relative to the reference plane S, the working reaction force will be divided into a component force in the direction along the second axis S2 and a further component force in the direction perpendicular to the second axis P1, relative to the cutter 5. Of these component forces, the component force in the direction perpendicular to the second axis P1 which tends to bend the cutter 5 is smaller than the original working reaction force. Thus, the tendency to bend the cutter 5 too is reduced. Accordingly, positional displacement of the blade edges of the cutter 5 will less likely occur, so that the precise tooth shape can be formed in the work.

As the cutter 5 of this embodiment comes into contact with the work under the slanted posture, a clearance angle is formed naturally between the plane of the work and the outer circumferential face of the cutter 5. Therefore, there is no need to provide any special clearance face in the cutter 5, so that the configuration of the cutter 5 can be simplified.

Further, as only the spiral-shaped teeth need to be formed in the surface of the cutter and there is no need to form a plurality of teeth intermittently like a blade of a hob cutter. Hence, the cutter configuration can be simple.

Since the blade shape of the cutter is adapted for the tooth shape of a crown gear to be formed, there is no need for re-cutting of teeth faces of the crown cutter after cutting.

[Mode of Cutting]

As shown in FIG. 1 and FIG. 2, when a crown gear is to be manufactured, a ring-shaped work 1 corresponding to the shape of the crown gear is supported to the turn table 11 of the work supporting portion 10 and the cutter 5 is supported to the cutter supporting portion 20. The work 1, when made of a metal material, can be a work prior to hardening, a work after hardening or a work after a working such as rough cutting. And, this work 1 is fixed to the turn table 11 by the chucks 12.

With the above-described setting, the second axis P2 is set under the set posture along the reference line L passing through the first axis P1 and extending radially as viewed in the direction along the first axis P1 and at the offset region offset from the reference line L. And, the second axis P2 is slanted relative to the reference plane S oriented perpendicularly to the first axis P1 and the blade edges 5A of the cutter 5 are disposed at a position where they can come into contact with the rotational plane of the work 1 at the slant angleθ.

Under the above-described condition, as the synchronization control unit 41 of the synchronized driving portion 40 controls the first electric motor M1 and the second electric motor M2 based on work data stored in the work data unit 42, a synchronized driving is effected for rotating the work 1 in a first direction R1 and rotating the cutter 5 in a second direction R2 at set speeds. During this synchronized driving, the synchronized driving portion 40 drives the third electric motor M3 to move the cutter 5, whereby the blade edges 5A of the cutter 5 are brought into contact the work 1 at the offset region, thus starting a cutting operation.

As shown in FIG. 2, in the synchronized driving of the work 1 and the cutter 5, control is effected for moving the outer circumference of the blade edges 5A at the leading end of the cutter 5 in the same direction as the moving direction of the work 1 at the same speed as the rotational moving direction of the work 1.

With this synchronized driving, the work 1 and the blade edges 5A of the cutter 5 come into contact at the same speed. However, as the blade edges 5A of the cutter 5 are placed in contact with the work 1 at the offset region, "skidding" occurs between the work 1 and the blade edges 5A. More particularly, in association with rotation of the work 1 along the first direction R1, the surface of the work 1 at the contacting position will move along an arc about the first axis P1; whereas, the blade edges 5A of the cutter 5 as being rotated about the second axis P2 move on the surface of the work 1 along the reference plane S and in the direction perpendicular to the reference line L. With this, between the work 1 and the blade edges 5A, "skidding" occurs in the radial direction about the first axis P1. And, the relative movement provided by this "skidding", a cutting by skiving is realized.

Incidentally, if the second axis P2 were disposed to be overlapped with the reference line L as seen in the plan view, the contact points of the work 1 and the blade edges 5A would both move in the circumferential direction about the first axis P1. So, almost no "skidding" would occur between the work 1 and the blade edges 5A; hence, cutting would be not possible.

As described hereinbefore, since the pair of blade edges 5A are formed with a shape which copies the shape of the tooth of the crown gear, with the cutting operation, teeth of the crown gear will be formed in the work 1.

As shown in FIG. 4, at the center of the cutter 5, the oil supplying hole 5C can be formed for supplying oil to the blade edges 5A during cutting.

In this case, resistance associated with cutting can be reduced. Further, as heat generated during the cutting operation is removed, the property of the work 1 will hardly change, whereby damage of the cutter 5 can be avoided also. Moreover, cutting chips produced from the cutting operation can be discharged effectively by the flow of oil.

[Function/Effect of Embodiment]

As described above, in the instant embodiment, by disposing the cutter 5 driven to rotate about the second axis P1 relative to the offset region of the work 1 which is driven to rotate about the first axis P1, "skidding" is produced, thus realizing cutting. And, during this cutting, a crown gear can be manufactured with high efficiency by rotating the work 1 and the cutter 5 at high speeds.

Further, as the cutting operation is effected only with the blade edges 5A portions at the leading end of the cutter 5 with slanting the second axis P2 relative to the reference plane S, in comparison with e.g. an arrangement of setting the second axis P2 parallel with the reference line L, it becomes easier to copy the shape of tooth formed in the work 1 to the shape of the blade edge 5A, and the manufacture of the cutter 5 too becomes easier.

And, at the time of cutting, the force effective in the bending direction of the cutter 5 is reduced and also with supply of oil to the oil supplying hole 5C of the cutter 5 during cutting, deformation due to the effect of heat is restricted and discharging of cutting chips is made easier.

Other Embodiments

In addition to the above-described embodiment, the present invention can alternatively be embodied as follows.

Figure 6:
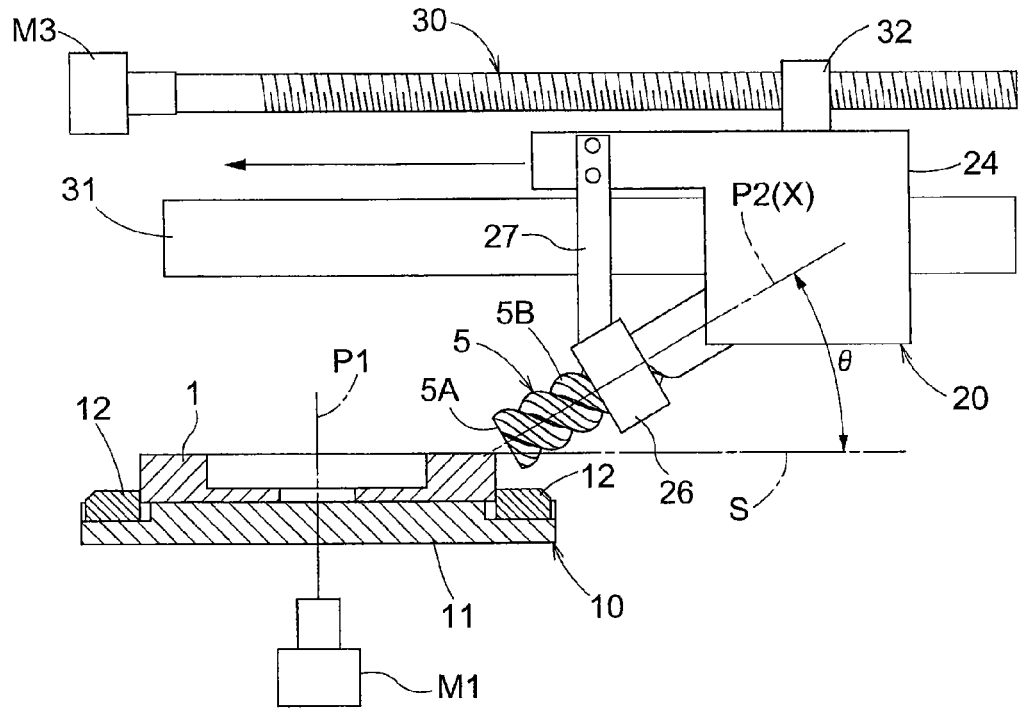
FIG. 6 is a side view showing a supporting arrangement of the cutter according to a further embodiment (a)

(a) As shown in FIG. 6, a support ring 26 is provided as an intermediate supporting portion for externally engaging and loosely rotatably supporting the cutter 5 at an intermediate position thereof in the direction of the rotational axis X, and this support ring 26 is supported to the movable frame 24 of the cutter supporting portion 20. By supporting the cutter 5 at its intermediate position by the support ring 26, bending deformation of the cutter 5 during a cutting operation is restricted, so that the manufacturing precision of the crown gear can be enhanced.

Figure 7:
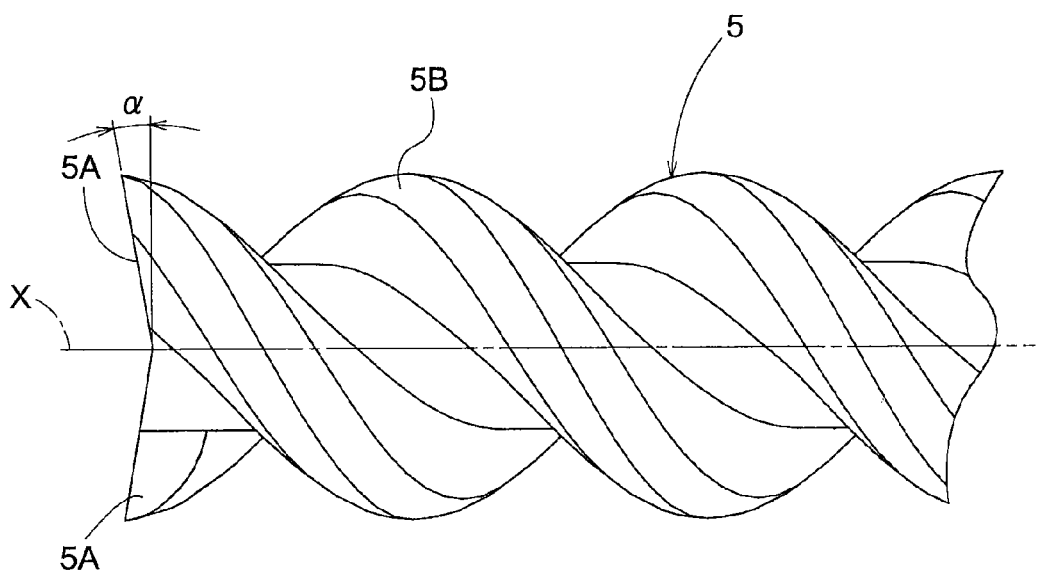
FIG. 7 is a side view showing a scoop angle of a blade edge of the cutter according to a further embodiment (b)

(b) As shown in FIG. 7, in the blade edge 5A of the cutter 5, a positive scoop angleα can be set. This scoop angleα is an angle representing the slant in the projecting direction of the blade edge 5A relative to the reference plane oriented perpendicular to the rotational axis X. With this setting of scoop angleα, a cutting operation with sharp scooping can be effected during cutting, so that efficient cutting will be realized.

Figure 8:
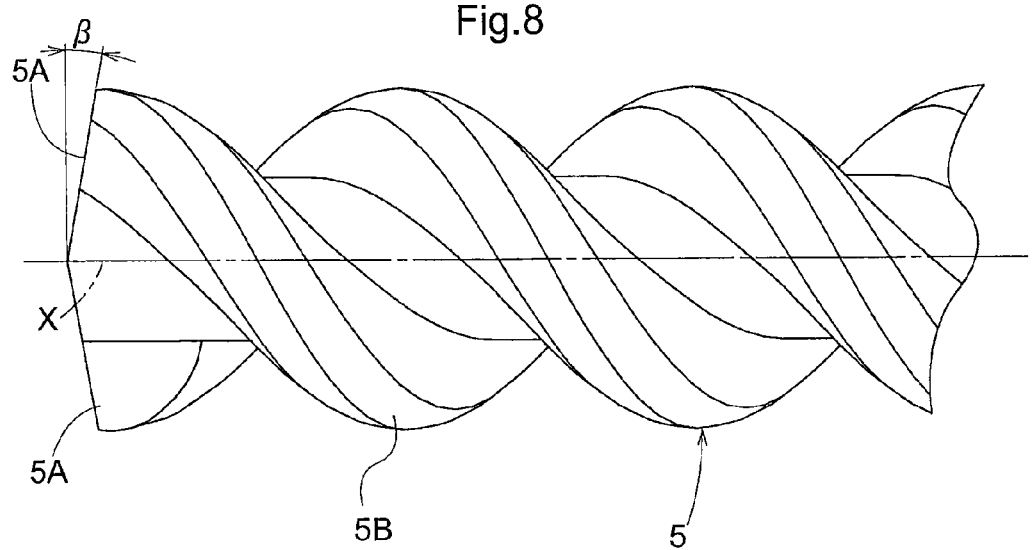
FIG. 8 is a side view showing a scoop angle of a blade edge of the cutter according to a further embodiment (c)

(c) On the other hand, as shown in FIG. 8, in the blade edge 5A of the cutter 5, a negative scoop angleβ can be set. This scoop angleβ is an angle representing the slant in the receding direction of the blade edge 5A relative to the reference plane oriented perpendicular to the rotational axis X. With this setting of scoop angleβ, the resistance experienced by the blade edges 5A of the cutter 5 when coming into contact with the work 1 is increased. However, the cut surface of the work 1 will be smoother and excessive biting of the blade edges 5A of the cutter 1 into the work 1 will be prevented. So that, the rotational condition of the cutter 5 will be maintained appropriate, and in correspondence with the increase in the scoop angle, the service life of the cutter 5 will be improved also.

(d) The cutter 5 can be configured such that the blade edges 5A of the cutter 5 are formed at three or more portions radially from the rotational axis X and the blade body 5B extends continuously helically from these three or more blade edges 5A. By forming the blade edges 5A at three or more portions as described above, through reduction in the rotational speed of the cutter 5 during cutting, frictional wear of the blade portions 5A of the cutter 5 can be realized.

Figure 9:
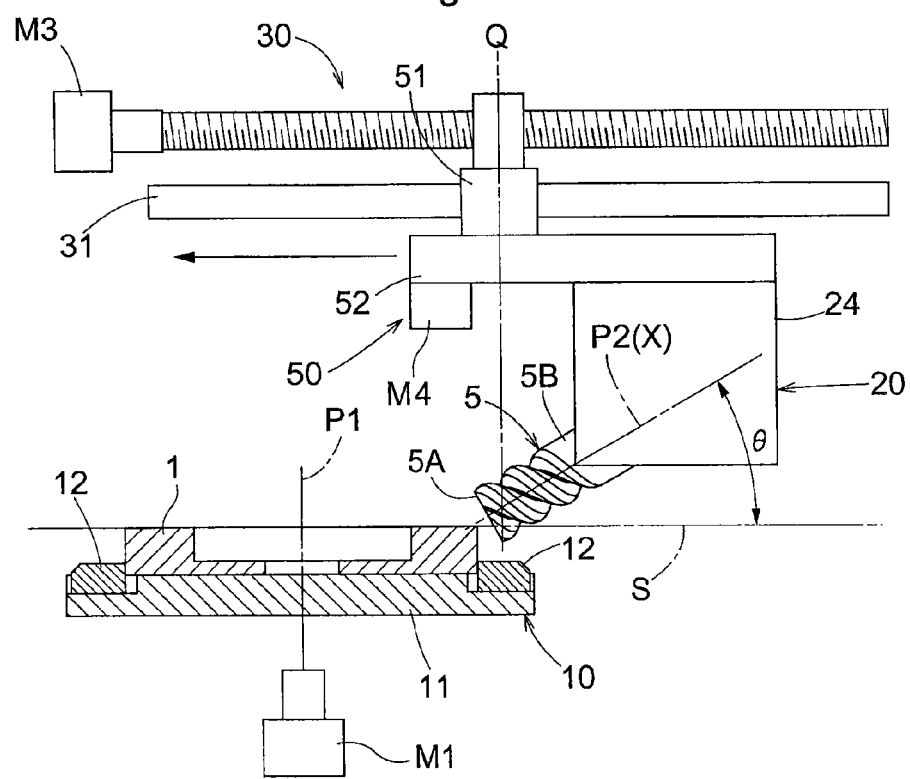
FIG. 9 is a side view showing a posture changing mechanism according to a further embodiment (e)

(e) As shown in FIG. 9, the crown gear manufacturing device can be alternatively configured as follows. Namely, in this, the cutter supporting portion 20 is supported to a posture changing mechanism 50 which is configured to pivot the cutter 5 about a pivot axis Q which extends through the contact point of the blade edge 5A of the cutter 5 with the work 1 and which extends parallel with the first axis P1, and the posture changing mechanism 50 is supported to the moving portion 30. The posture changing mechanism 50 includes a movable unit 51 movably supported to the guide rail 31, and a coupling unit 52 operably coupled with the movable unit 24. The movable unit 51 and the coupling unit 52 are connected to each other to be pivotable about the pivot axis Q and have their pivotal posture set by a fourth electric motor M4. With this arrangement, it is possible to pivot the posture of the second axis P2 with the range of set posture along the reference line L, as viewed in the direction along the first axis P1.

Figure 10:
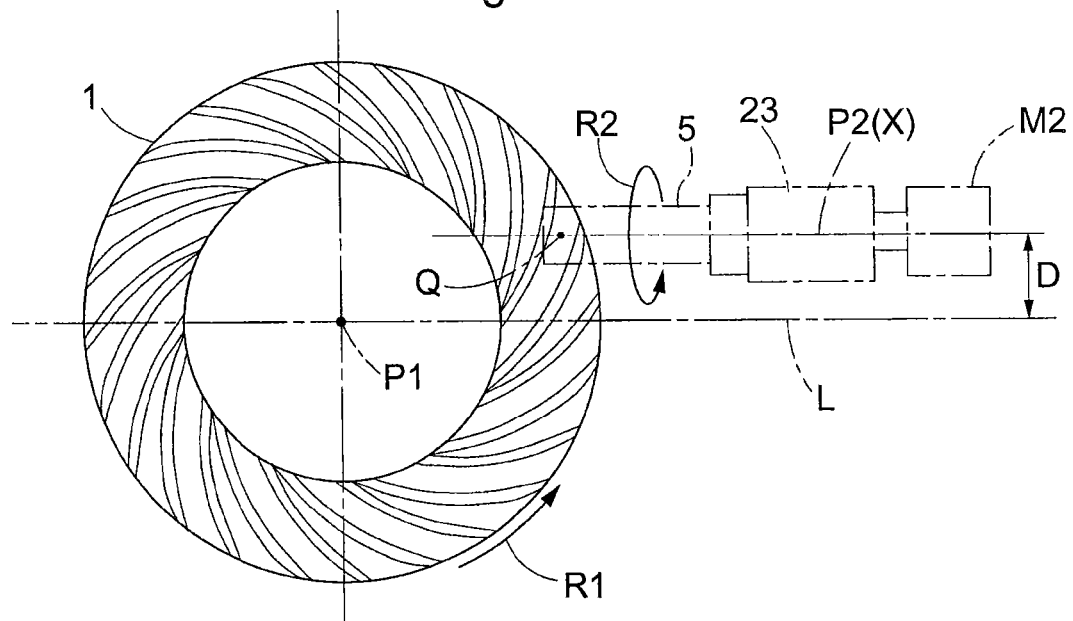
FIG. 10 is a plan view showing a pivoting mode of the cutter according to the further embodiment (e)
Figure 11:
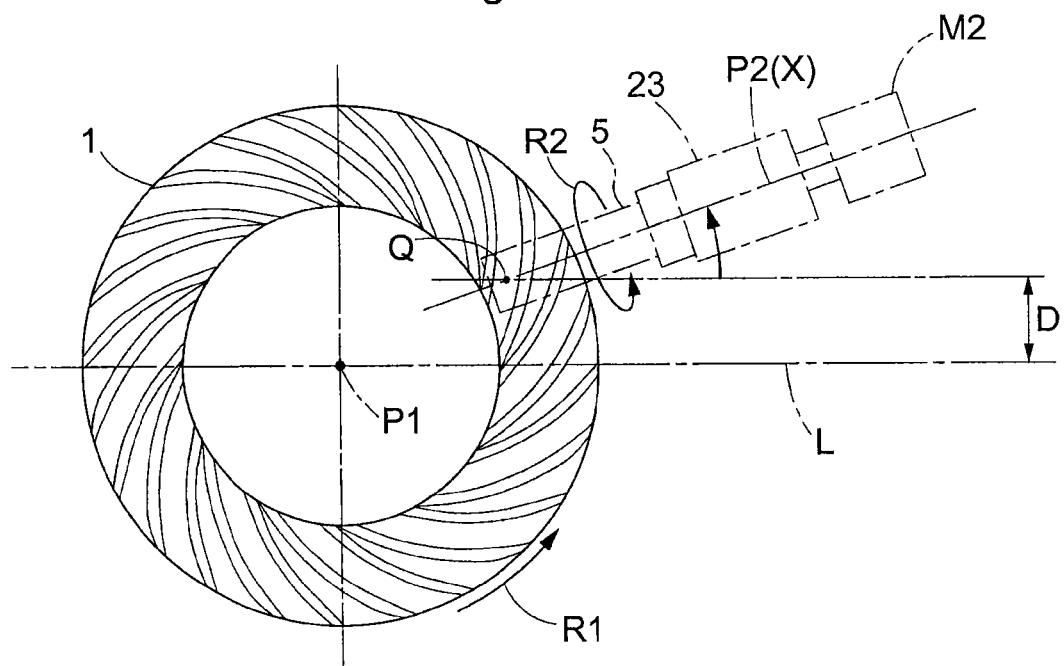
FIG. 11 is a plane view showing the pivoting mode of the cutter according to the further embodiment (e).

In this further embodiment (e), the arrangement of disposing the blade edges 5A of the cutter 5 at the offset region and slanting the second axis P2 by the slant angle θ relative to the reference plane S is maintained. And, under the initial condition of cutting the outer circumference of the work 1 as viewed in the direction along the first axis P1, as shown in FIG. 10, the posture of the second axis P2 is set to a posture parallel with the reference line L. Thereafter, as approaching the first axis P1 of the work 1, the cutter 5 will be pivoted about the pivot axis Q by the posture changing mechanism 50. In this ways, while the cutter 5 is being fed toward the center of the work 1, the second axis P2 of the cutter 5 will be pivoted about the pivot axis Q extending parallel with the first axis P1 of the work 1, thereby to constantly maintain the tooth trace formed in the work 1 and the second axis P2 to a fixed angle. With this, it becomes possible to obtain a tooth shape having a same cross sectional shape at all positions from the outer circumference side to the inner circumference side of the work 1.

Incidentally, the arrangement of this further embodiment (e), the cutter supporting portion 20 can be provided at a leading end of a manipulator. And, any arrangement can be used as long as it allows pivoting of the cutter 5 about the pivot axis Q.

INDUSTRIAL APPLICABILITY

The present invention can be used as a device and a method for effecting a cutting work of a crown gear inclusive of phase gears, by skiving.

DESCRIPTION OF REFERENCE MARKS/NUMERALS

1 work
5 cutter
5A blade edge
5B blade body
5C oil supplying hole
10 work supporting portion
20 cutter supporting portion
30 moving portion
31 guide rail
40 synchronized driving portion
50 posture changing mechanism
L reference line
P1 first axis
P2 second axis
S reference plane
X rotational axis
α scoop angle
β scoop angle
Q pivot axis

The invention claimed is:

1. A device for manufacturing a crown gear comprising:
a work supporting portion for supporting a work rotatably about a first axis;
a cutter supporting portion for supporting a cutter rotatably about a second axis different from the first axis;
a synchronized driving portion for rotating the work supporting portion and the cutter supporting portion in synchronism with each other; and
a moving portion for moving the cutter supporting portion relative to the work supporting portion; wherein
the second axis is disposed under a set posture along a reference line passing through the first axis and set at an offset region offset from the reference line as viewed along a direction parallel with the first axis and the second axis is disposed under a posture slanted relative to a reference plane extending perpendicular to the first axis, whereby the work supporting portion and the cutter supporting portion are configured to cause a leading end of the cutter to contact with the work at the offset region at an angle relative to a rotational plane of the work;
the synchronized driving portion rotates the work supporting portion and the cutter supporting portion in synchronism in such a manner to move an outer circumference of a blade edge at the leading end of the cutter in a direction same as a rotational direction of the work;
the moving portion moves the cutter in a direction along the reference line;
the blade edge of the cutter projects outwards from the second axis;
a blade body portion is formed in a spiral shape to extend continuously from the blade edge along the second axis;
the cutter supporting portion includes a holder for supporting a proximal end portion of the cutter, and an intermediate supporting portion for supporting the blade edge at an intermediate position of the cutter relative to a longitudinal direction thereof to maintain the cutter in the posture slanted relative to the reference plane; and
the intermediate supporting portion supports the blade body via a support ring.

2. The crown gear manufacturing device according to claim 1, wherein
a scoop angle is set to render the blade edge to a posture where the blade edge progressively projects or recedes in the direction along the second axis as the blade edge moves away from the second axis.

3. The crown gear manufacturing device according to claim 1, wherein an oil supplying hole for supplying oil to the blade edge is formed along the second axis.

4. The crown gear manufacturing device according to claim 1, wherein the cutter supporting portion includes a posture changing mechanism for changing the posture of the cutter about a pivot axis parallel with the first axis; and
the posture changing mechanism changes the posture of the second axis in correspondence with a tooth shape of a crown gear to be manufactured when the cutter is moved along the reference line by the moving portion.

5. The crown gear manufacturing device according to claim 1, wherein the moving portion moves the cutter supporting portion back and forth along a guide rail.

6. The crown gear manufacturing device according to claim 1, wherein the blade edge of the cutter is set with a scoop angle having a slant angle relative to the reference plane under a posture perpendicular to the rotational axis of this cutter.

7. The crown gear manufacturing device according to claim 4, wherein the blade edge of the cutter passes a contact point contacting the work and the cutter is pivoted about a pivot axis parallel with the first axis.

8. The crown gear manufacturing device according to claim 4, wherein while the moving portion is feeding the cutter toward the center of the work, the posture changing mechanism pivots the cutter about the pivot axis so as to constantly maintain a tooth trace formed in the work and the second axis at a fixed angle as viewed in the direction along the first axis.

9. A method for manufacturing a crown gear comprising the steps of:
   supporting a work rotatably about a first axis;
   supporting a cutter by a cutter supporting portion to be rotatably about a second axis different from the first axis;
   disposing the work and the cutter with disposing the second axis under a set posture along a reference line passing through the first axis and at an offset region offset from the reference line as viewed along a direction parallel with the first axis and disposing the second axis under a posture slanted relative to a reference plane extending perpendicular to the first axis, whereby the work and the cutter are configured to cause a leading end of the cutter to contact with the work at the offset region at an angle relative to a rotational plane of the work, wherein
   the cutter has a blade edge at the leading end of the cutter projecting outwards from the second axis;
   a blade body portion is formed in a spiral shape to extend continuously from the blade edge along the second axis;
   the cutter supporting portion includes a holder for supporting a proximal end portion of the cutter, and an intermediate supporting portion for supporting the blade edge at an intermediate position of the cutter relative to a longitudinal direction thereof to maintain the cutter in the posture slanted relative to the reference plane; and
   the intermediate supporting portion supports the blade body via a support ring;
   rotating the work and the cutter in synchronism in such a manner to move an outer circumference of the blade edge in a direction same as a rotational direction of the work; and
   moving the cutter parallel with the reference line, whereby the work is cut by the cutter.

* * * * *